(12) United States Patent (10) Patent No.: US 8,930,247 B1
Zhang et al. (45) Date of Patent: Jan. 6, 2015

(54) SYSTEM AND METHODS FOR CONTENT-BASED FINANCIAL DECISION MAKING SUPPORT

(75) Inventors: Xiaoping Zhang, Mississauga (CA); David Kedmey, St. Louis, MO (US); Fang Wang, Mississauga (CA)

(73) Assignee: FinancialSharp, Inc., Chicago, IL (US)

( * ) Notice: Subject to any disclaimer, the term of this patent is extended or adjusted under 35 U.S.C. 154(b) by 977 days.

(21) Appl. No.: 12/023,934

(22) Filed: Jan. 31, 2008

Related U.S. Application Data

(60) Provisional application No. 60/898,738, filed on Jan. 31, 2007.

(51) Int. Cl.
*G06Q 30/00* (2012.01)
*G06Q 10/06* (2012.01)
*G06F 17/18* (2006.01)

(52) U.S. Cl.
CPC ............ *G06Q 10/0639* (2013.01); *G06F 17/18* (2013.01)
USPC ................ 705/35; 705/36 R; 705/37; 706/12; 706/13; 706/19

(58) Field of Classification Search
CPC ... G06Q 10/0639; G06Q 40/04; G06Q 40/06; G06F 17/18; G06N 3/08; G06N 5/022; G06N 5/025
USPC ................... 705/35, 36 R, 37; 706/12, 13, 19
See application file for complete search history.

(56) References Cited

U.S. PATENT DOCUMENTS

| | | | |
|---|---|---|---|
| 5,974,412 A | | 10/1999 | Hazlehurst et al. |
| 6,920,448 B2 | | 7/2005 | Kincaid et al. |
| 7,130,836 B2 * | | 10/2006 | Grosser et al. .................. 706/47 |
| 2003/0009399 A1 | | 1/2003 | Boerner |
| 2005/0273424 A1 * | | 12/2005 | Silverman et al. .............. 705/39 |
| 2006/0047590 A1 * | | 3/2006 | Anderson et al. .............. 705/35 |
| 2006/0202037 A1 | | 9/2006 | Gunawardena et al. |
| 2008/0071656 A1 | | 3/2008 | Steuben et al. |

OTHER PUBLICATIONS

Non-Final Office Action for U.S. Appl. No. 12/023,908, dated Jul. 20, 2010.
Final Office Action for U.S. Appl. No. 12/023,908, dated Feb. 4, 2011.
Office Action dated Jul. 19, 2012 for corresponding U.S. Appl. No. 12/023,908.

* cited by examiner

*Primary Examiner* — Kirsten Apple
*Assistant Examiner* — Scott S Trotter
(74) *Attorney, Agent, or Firm* — K&L Gates LLP

(57) ABSTRACT

Robust content-based decision-making support is enabled by software with a customizable knowledge base. Utilizing proprietary information contained within a knowledge base, the software enables users to search the indexed database by feature, example firm, or pattern and update the knowledge base based on the results. The information contained in the knowledge base enables results to be ranked by relevance and enables other feedback to be provided. The system and methods provide process support by helping financial professionals identify, analyze, and construct data analysis patterns based on individual domain knowledge and preferences. The system and methods automatically detect abnormal patterns and automatically analyze their correlations to market events to provide further process support to financial professionals. Using the results of any searching, analysis, and processing, the system and methods provide a neural network or other learning algorithm to provide content-based decision-making support.

14 Claims, 9 Drawing Sheets

US 8,930,247 B1

SYSTEM AND METHODS FOR CONTENT-BASED FINANCIAL DECISION MAKING SUPPORT

PRIORITY CLAIM

This application is a non-provisional application of, claims priority to and the benefit of U.S. Provisional Patent Application Ser. No. 60/898,738 filed Jan. 31, 2007, which is incorporated herein in its entirety.

TECHNICAL FIELD

The present application relates in general to analyzing data contained in financial databases and more specifically to a system and methods for performing intelligent, content-based indexing, searching, retrieval, analysis, processing of data, and decision-making based on the data contained in the financial database.

BACKGROUND

Traders, investment bankers, researchers, insurance underwriters, and other financial professionals (referred to as a "financial decision-maker" or "trader") rely on information contained in financial market databases to inform their decisions. Markets on which financial instruments are traded, such as the New York Stock Exchange, are extraordinarily volatile and dynamic, so traders need real-time data about the state of the market and historical data about previous market environments to make wise, informed investment decisions. Moreover, certain markets may facilitate the simultaneous buying and selling of millions of financial instruments (i.e. on a given market, thousands of securities issued by thousands of firms may be traded at substantially the same time), may be capable of changing drastically in a few seconds' time, or may exhibit characteristics that could be better understood through research of decades of market history. Traders are therefore unable to remain abreast of the developments in each relevant market based on actual personal perception alone.

To enable immediate, meaningful, and manageable access to information about such markets, many firms provide and maintain databases with detailed and comprehensive historical financial data, continuously updated with real-time financial data. Firms such as Commodity Systems, Inc., Hemscott, Morningstar, Cannex, Hoovers, Thomson Financial, Standard & Poor's, Reuters, Bloomberg, Interactive Data, and Gradient Analytics provide databases accessible to end users over the Internet or other similar networks. For example, data about firms whose securities are traded on the New York Stock Exchange may be contained in a database maintained by one of the above firms. Further, information about each transaction of a security or other financial instrument may also be contained in such a database. Traders engaging in transactions of instruments traded on the relevant market (e.g. the New York Stock Exchange) are given client-level access to a database associated with the market. This access provides users with client-level privileges, and enables traders to perform basic searches, such as keyword or rule-based searches. Traders perform what they perceive to be necessary or relevant searches and analyze the results to determine whether or not to buy or sell a security or other financial instrument.

The searching functionality enabled by the databases and available to traders is typically rudimentary, and usually does not provide traders with tools to usefully analyze data or to meaningfully contribute to the traders' decision-making process. However, client-level access to such databases enables the development and implementation of client-side software applications. Such applications are capable of performing the same keyword and rule-based searches, but provide the added benefits of enabling multiple searches to be performed in quick succession and assimilating and organizing the results of such searches into more meaningful formats for near real-time analysis by the trader.

Searches that are currently enabled by available client-side software applications are limited by their static nature. A client-side software application may store sets of search criteria and repeatedly run the same search without user intervention (i.e. once a day for a month, or once a week for a year). However, a trader must initially indicate with specificity the criteria defining the automated search. Thus, each search requires the trader to synthesize the universe of the trader's knowledge to generate the database queries. Moreover, currently available search tools do not enable the criteria to be automatically updated or dynamically improved based on the trader's propensities, the results of previous searches, or the eventual success of positions taken based the search results.

Current software solutions are also limited in that they require the trader to define with specificity the logic necessary to usefully summarize, present, and analyze data retrieved from financial databases. Current software applications may manipulate and organize data to display it such a way as to enable a trader to quickly analyze the data, but the trader must still specify the parameters enabling the software to so organize the data. Thus, if a trader is searching for a particular pattern in a time series data set, the trader must search each potential data set and manually analyze whether a similar pattern can be found. Current search capabilities and client-side software applications do not organize and summarize data based on features determined by information processing, system learning, or domain knowledge contained in a local knowledge depository.

Finally, currently available client-side software is not capable of building a knowledge base of a particular user's prior searches, trades, and other decisions to enable decision support. Current client-side software is limited to statically storing previous search criteria, data presentation parameters, and the resulting trades. The software is not capable of intelligently determining relationships between, for example, a change in search criteria that results in the trader making a particular trade based on the change in criteria and the success of the resulting trade. Though current solutions enable searches to be replicated and repeated, these solutions cannot analyze any relationships between the searches and the actions resulting from the searches to aid the trader in making similar decisions in the future.

SUMMARY

A system and methods to enable robust content-based financial database indexing, searching, retrieval, analysis, processing, and decision making are disclosed. A system and methods for implementing software including a customizable knowledge base and analysis platform are provided to an investor or other user of a financial database who trades and analyzes financial instruments. The software includes a knowledge base which stores one or more financial features. A feature is defined as a characteristic of a set of data that is helpful to an investor such that knowing a set of data includes the feature enables the investor to more easily make an investment decision. The system and methods disclosed index data contained in an existing financial database, such as a database maintained by Standard & Poor's, based on features contained in the knowledge base. The indexed database enables the investor to manipulate the indexed data by comparing data to vectors stored in the indexed database representing one or more features (the feature vectors). For example, a trader may search the financial objects contained in the indexed database by specifying an example firm or drawing a graph representing a desired feature. Utilizing the features contained in the knowledge base, the system and methods determine at least one feature vector indicative of one feature contained in the example firm or graph (the query feature vector). By comparing the query feature vector with the feature vectors contained in the indexed database, a similarity score can be calculated and the most relevant results can be provided to the user. Preferably, the system and methods also enable the trader to indicate the relevance of each search result—this indicated relevance enables the software to refine its knowledge base such that the knowledge base is customized to each trader using the software. Finally, the system and methods disclosed enable robust financial analysis and processing, as well as decision support, based on the features contained and continually refined in the knowledge base.

The features by which the financial database is indexed may be sets of characteristics about time series of data. For example, the cyclical nature of a particular time series of data may be a feature, or it may be a feature if a large jump in a time series of data occurs. Thus, the term "feature" is broadly defined to represent characteristics of time series of data that are or may be of interest to a trader. Preferably, features represent properties within time series data that are too complex for a trader to recognize by manual data analysis. For example, aberrations in data caused by inflation, recession, stock splits, events in the news, or other external data may make a cyclical pattern contained in time series data undetectable to an investor. Additionally, features may be generated as derivatives of known features, or may be generated by comparing two or more features with each other and extracting similarities or differences. Moreover, features are preferably represented as vectors (feature vectors) which may be compared to time series data sets to determine whether the feature is present in the data set. Alternatively, the system and methods may be configured to detect text-based features, such as information contained in a press release relating to the impact of a news event on a stock price. These text-based features are difficult for a trader to determine by entering simple rule or keyword-based searches, since the structure of the language in the news item is not guaranteed or predetermined. Using the system and methods disclosed, these features are easily determinable.

The knowledge base includes one or more user preferences, which may be features that are updated, amended, refined, and created as users perform searches and provide feedback. Alternatively, the user preferences may be represented by past user activity within the system, such as a user's past investment decisions. To initially index a financial database, the data contained within the database is first converted to time series data sets. The time series data may be data about price, volume bid/ask spreads, market indices, price-to-earnings ratio, earnings-per-share, or any other suitable time-series data. The system and methods analyze each set of time series data from the financial database to determine whether any of the features contained in the knowledge base are present in the time series data. Any time series data containing one or more features may then have a signal-processing transform, such as a wavelet transform, applied to it. Next, the indexing may identify features or search patterns that are of most interest to the user. Using the domain knowledge about the particular user, the system and methods disclosed conduct dimension reduction on the entire set of features found in the time series data, and store the features as feature vectors, along with their relations to the original financial data, in an indexed database. In different embodiments, the domain knowledge includes one or more user preferences, which may be features of particular importance to the user, may be past decisions made by the user, or may be the customized model parameters that are used in the search, retrieval, analysis, processing, and decision-making. Additionally, the system and methods disclosed may index textual data based on features contained in the textual data by searching for keywords in the text and identifying one or more quantifying modifiers using natural language parsing techniques. These features are also stored in the indexed database.

Indexing data in a financial database according to features contained in time series enables robust content-based searching. The system and methods disclosed enable a trader to perform example-based or pattern-based searches to search for time series data with some level of correlation to an example firm or user-input pattern. For example, if a trader believes that a particular company X represents a good investment risk, the system or method disclosed enables the trader to specify that he or she would like to retrieve information about firms that are "like company X." Based on the domain knowledge applicable to the particular user, the system and methods analyze the indexed features about company X to determine what features time series data about company X contains. Based on the determined feature vectors (the query feature vectors), the system and methods compare the query feature vectors to the feature vectors associated with each firm in the indexed database to determine the firms including the most similar features. The system and methods display the most similar results to the user, and enable the user to indicate whether and to what extent certain search results are desirable. The user-input similarity scoring is used to refine the results of the search and to bolster the domain knowledge to provide more accurate results in the future.

The system and methods described may also enable a user to provide as input a hand-drawn or electronically-drawn chart, graph, or trend. Thus, a trader may recreate the shape of a desired financial indicator (e.g. price-to-earnings ratio, market-to-book value). Based on the user-input chart or graph, the system and methods create a time series of data and analyze the time series to determine the features present (the query feature vectors). The system and methods apply the feature or features present in the input time series data to the indexed database and return the most relevant indexed financial objects to the trader. Each returned result may include an input mechanism to enable the user to indicate the relevance of each result. As above, the user-input relevance scores are stored in the domain knowledge to enable more accurate searching in the future.

The system and methods disclosed may also perform automatic signal processing tasks such as noise or trend removal. Preferably, after a financial database has been indexed according to a set of features stored as domain knowledge, the system and methods disclosed use an individual trader's preferences, past search requests, and past trades and other responsive actions to process the indexed data in a customized way. The system and methods may apply one or more mathematical transforms, such as a wavelet transform, to a time series of interest in the indexed database. The results of the filtering may then be provided to the user, along with a mechanism to enable the user to indicate the usefulness and correctness of the processed data. In this way, the user may adjust selected quantitative criteria such as different mathematical error metrics. If the results are unsatisfactory, the processing may be repeated until the user indicates the results are satisfactory.

Finally, the system and methods disclosed herein provide decision support and analysis to a user. The system and methods disclosed learn from individual users based on the nature of the search performed, the post-processing performed on the data, and the investor's previous decisions based on data retrieved from the same search. The system and methods disclosed search historical and real-time data available in the indexed database or remotely to determine whether similar investment opportunities exist. By presenting system-determined investment opportunities and recording the user's reactions, the system continually updates its knowledge base and thus continually updates the set of criteria perceived as important to the individual investor. Over time, the system and methods disclosed become a customized decision-making tool with increasing accuracy and efficiency.

It is an object of the present disclosure to provide a system that identifies and is capable of learning to identify features of financial data that closely mirror traders' thought processes such that traders may request information in intuitive, flexible, and ambiguous ways.

It is a further object of the present disclosure to provide a system and methods to index data contained in an available financial database such that the data is stored in an indexed database indexed according to features found in the data.

It is a further object of the present disclosure to enable a user to search and retrieve information from a financial database using content-based intelligence based on features of the financial data stored in the indexed database.

It is a further object of the present disclosure to provide a system and methods capable of building a knowledge base for each user of the system and methods based on the user searches, feedback, and decisions. This knowledge base enables the system and methods disclosed to improve search relevance and further improve search, analysis, and processing functionalities in an intelligent way.

It is a further object of the present disclosure to provide a user with decision support based on the information contained in the knowledge base applicable to the user. In this way, the system and methods stimulate the user's decision-making process by learning from the user and automating future components of the decision making process.

It is a further object of the present disclosure to provide the above-described indexing, searching, processing, analysis, and decision support based on at least one user preference, such that the system and methods behave in a customized way with respect to the user.

Additional features and advantages are described herein, and will be apparent from, the following Detailed Description and the figures.

DETAILED DESCRIPTION

Figure 1:
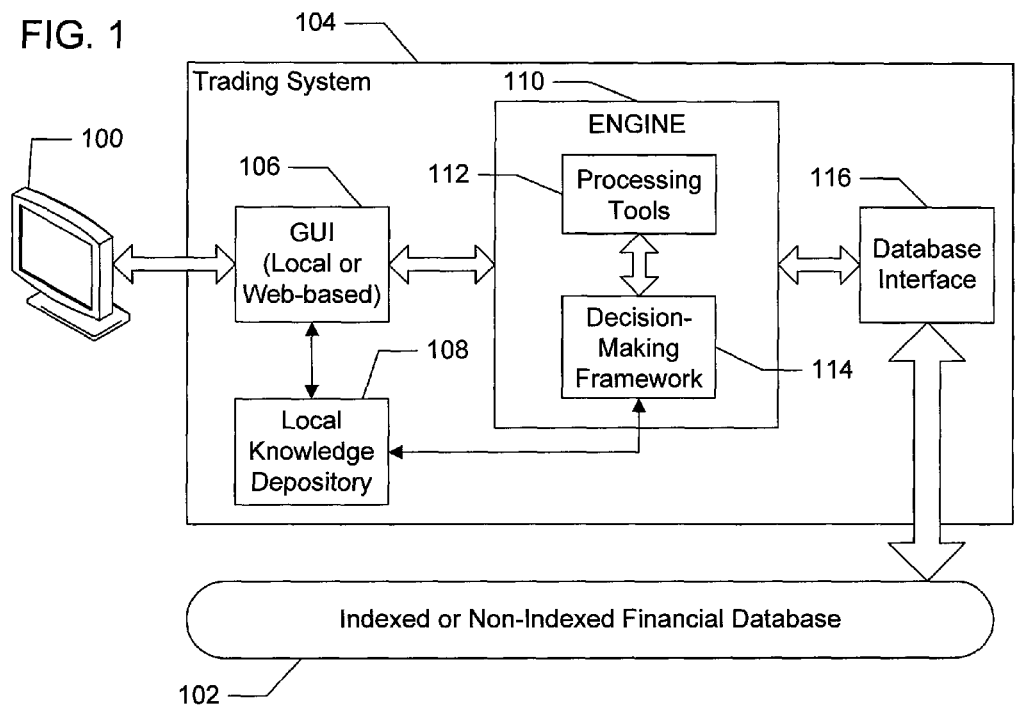
FIG. 1 is a schematic diagram of an example system for performing intelligent, content-based searching, retrieval, analysis, processing, and decision making.

The system and methods disclosed herein rely in different capacities on determining and manipulating features of financial objects. It should be appreciated that a feature of a financial object, as disclosed herein, includes any set of characteristics of financial data that would be useful to a trader, an underwriter, or any other person using the system. Data contained in a financial database, which may be either time-series data (i.e., data that details the performance of a characteristic of a financial object over time) and textual data (i.e., press releases, news articles, columns, etc.). It should be appreciated that it is an advantage of the disclosed system and methods to enable a user to define his or her own features, either explicitly or implicitly, as discussed below. However, the system and methods also recognize various features of both time-series data and textual data. Table 1, reproduced below, illustrates an example set of features of financial objects recognizable by the system and methods disclosed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

TABLE 1

| Feature Category | Feature Examples |
| --- | --- |
| Equities such as common stock, preferred stock, exchange traded funds, mutual and closed-end funds, real estate investment trusts, master limited partnerships, | Price, volume, bid, ask, trade time, earnings per share, dividend announcement date |

TABLE 1-continued

| Feature Category | Feature Examples |
|---|---|
| royalty trusts, enhance income securities and other forms of private and public equities in US and non-US markets | |
| Options on equities, futures, currencies, and other derivatives contracts, OTC and exchange traded in US and non-US markets | Price, volume, strike price, issue date, expiration date, delta, gamma, Black-Scholes model parameters |
| Fixed income securities | Face value, market price, volume, nominal interest rate, market yield, conversion option, date of issue, maturity date, accrued interest, sinking fund, debt covenants |
| Futures and forwards contracts such as commodities futures, interest rate futures, equity index futures, single stock futures | Price, volume, bid, ask, delivery date, margin requirements, |
| Quantified credit ratings | S&P investment grade AAA, S&P non-investment grade BB, Moody's investment grade Aaa, Moody's speculative grade Ba1 |
| Asset pricing model parameters | Alpha, beta, Sharpe ratio, Fama-French model factors |
| GAAP accounting line items | Revenue, cost of goods sold, selling, general and administrative expenses, depreciation, amortization, interest income, interest expense, net income, extraordinary items, cumulative effect of accounting changes, cash and cash equivalents, short term investments, accounts receivable, property, plant and equipment, accounts payable, short term debt, long term debt, common stock, additional paid-in-capital, shareholder's equity |
| Non-GAAP accounting measures | EBITDA, free cash flow, overhead |
| Valuation metrics | Enterprise value, liquidation value, return on assets, return on equity, return on debt |
| Projected and historical pro forma financial statement items | |
| Items in accounting disclosures | |
| Information disclosed in SEC Form-10K, Form 10-Q, Form S-1, proxy statements, and other public and private company disclosures | Net operating loss carry forwards, federal state and local taxes in financial statement footnotes, contingencies and commitments described in management discussion and analysis |
| Profitability measures | Rate of return on assets, internal rate of return |
| Capital structure | Number and value of shares, options, warrants, preferred stock, market capitalization, value of debt outstanding |
| Operational variables | Number of customers, number of store closings, same store sales, sales per square foot, churn rate |
| Debt covenants | Coverage ratio requirements, bad boy clauses |
| Technical analysis measures | Elliot wave patterns, head and shoulder formations |
| Macro economic variables | GDP, federal funds rate, unemployment rate, inflation rate, foreign exchange rates, yield curve |
| Audit report items | |
| Analyst estimates | |
| Research report items | Price targets, research firms providing coverage, buy-hold-sell ratings, corporate takeover defense structure |
| Commitment of Traders Report data | Commercial open interests, non-commercial open interests, non-reportable positions, number of traders |

It should be appreciated that the feature categories and feature examples included in Table 1 are provided by way of example only. For example, the instant disclosure contemplates GAAP and non-GAAP accounting line items known to financial professionals but not included in Table 1. In additional to the exemplary features in Table 1, the system and methods disclosed may perform processing operations to data containing features that are derivative features of those features disclosed in Table 1. Moreover, the system and methods disclosed may perform processing operations to data containing features that are generated by comparing two or more features with one another to result in a new feature.

Textual data may include features defined by keywords and generated as discussed below. A non-exhaustive list of keywords which may in different embodiments define features of textual data follows: stock ticker symbols; company names; "gross domestic product;" "GDP;" "earnings;" "Chief Executive Officer;" "CEO;" analyst names; potential merger candidates; names of board members; institutional ownership; rosters of insiders; rosters of major holders; words indicating merger and acquisition activity (e.g., "carve out," "spin off," or "338 tax election"); names of members of management of competitor firms; and any keywords illustrative of one of the time-series data features included in Table 1 above. It should be appreciated that features of textual data may be derived from the above list of features, or may be created by comparing two or more existing features.

FIG. 1 is a schematic diagram illustrating an example implementation of the system described herein. In one example embodiment, a user accesses the system described by way of a terminal 100. The terminal ultimately enables the user to interact with the financial database 102, which contains information about financial instruments, firms by whom the financial instruments were issued, and the overall performance of one or more markets on which financial instruments are traded. The terminal 100 is connected to the Trading System 104 such that the terminal 100 may send information to and receive information from the Trading System 104. In the example embodiment depicted in FIG. 1, the Trading System 104 is designated as System 1, and includes all modules illustrated in FIG. 1 except the terminal 100 and the financial database 102. It should be appreciated that the user of the trading system accessing the system by way of the terminal 100 may be a trader, an investment banker, an insurance underwriter, a researcher, or another financial professional. For clarity, the user throughout the remainder of the application will be referred to as a "trader" or a "user."

As illustrated in FIG. 1, the terminal 100 is connected to the Trading System 104 such that the terminal 100 interacts directly with the graphical user interface (GUI) module 106. The GUI module 106 may reside on a local machine, connected to the terminal 100 by a local network connection. Alternatively, the GUI module 106 may reside on a web server such that the terminal 100 interacts with the GUI module 106 by way of the Internet or other similar network. A user at terminal 100 provides commands to the Trading System 104 by way of the terminal 100 as enabled by the GUI module 106.

Each time the Trading System 104 receives a command from the terminal 100, the GUI module interacts with the knowledge depository module 108 and the engine module 110. The functionality of each module is discussed in greater detail below. The user-entered command is provided to the knowledge depository module 108 for storage and later use by the engine module 110. As discussed below, each additional stored user-entered command enhances the robustness of the system's domain knowledge. The user-entered command is also provided to the engine module 110 for execution. The engine module 110 includes a processing tools sub-module 112 and a decision-making framework sub-module 114. The processing tools sub-module 112 performs the searches, retrievals, analyses, and processing operations, as discussed in greater detail below. The decision-making framework sub-module 114 interacts with the knowledge depository module 108 to receive information about the user's past actions in the Trading System 104, representing the system's domain knowledge. In different embodiments, the knowledge depository module 108 stores information about one or more user preferences, such as a feature of particular importance to the user or information about a past decision, search, processing task, or other activity performed by the user using the Trading System 104, or the customized model parameters that are used in the search, retrieval, processing, and decision-making performed by the engine module 110. The decision-making framework sub-module 114 may receive only information about the user's past activities in the Trading System 104, despite the fact that the knowledge depository module 108 may contain information about the user's past activities and the user's attempted current activity.

The knowledge depository module 108 may include information that is modularized for each user that has accessed the Trading System 104. The information contained in the knowledge depository module 108 for a given trader may be referred to as a Local Knowledge Depository (LKD). By modifying the LKD, the Trading System 104 may be trained to search, retrieve, and present information to a trader in a manner customized to a given trader. As a user accesses and uses the Trading System 104, the knowledge depository module 108 accumulates and stores information associated with that user. The information stored represents the human intelligence and judgment of each trader. Thus, it is important that the knowledge depository module 108 does not apply information representing the judgment of one trader to the activities of another trader, as the two pieces of information may not be consistent. However, the knowledge depository module 108 may enable users to proactively instruct the system to apply information associated with a different trader as part of the relevant LKD when such instruction is done consciously. Thus, information stored relating to a given trader may be modified, circulated, and traded so that it applies as intended to a different trader, for example if multiple traders in a single organization wish to apply the domain knowledge of a particularly successful trader in the firm.

As discussed in greater detail below, the engine module 110 uses information about the user's attempted action, received from the GUI module 106, in combination with information about the user's past actions, received from the knowledge depository module 108, to perform the requested action. By modifying an individual trader's LKD, the functionality of the engine module 110 may change when it is accessed by the trader. Such changes in functionality enable intelligent content-based searching, analysis, processing, and decision making, and are discussed in greater detail below.

If the engine module 110 determines that, based on the type of action requested and the trader's LKD, the action requested requires one or more database queries to one or more financial databases 102, the engine module 110 sends an appropriate message to the database interface module 116, contained within the Trading System 104. The database interface module 116 converts the message from the engine module 110 into database queries of the appropriate format to interact with the financial database 102, and sends the queries to the appropriate financial database 102. It should be appreciated that in different embodiments, the database 102 may be a flat database containing data about financial objects, or may be an indexed database containing financial objects and the features associated with the financial objects, discussed below. The financial database 102 may also include only historical data—that is, data that is not updated real-time to reflect fluctuations in the market. Since many traders use real-time data to support trading decisions, historical data available in the financial database 102 may not be sufficient to enable accurate financial decisions. In this example, the database interface 116 or another module may enable a user to interface with source of real-time data (not shown). Alternatively, the database interface 116 or another module may enable the engine 110 to interface with a source of real-time data, such that the local knowledge depository 108 may utilize real-time data contained in one or more real-time databases.

The financial database 102 satisfies the queries sent by the database interface module 116 and provides the queried information to the database interface module 116. The database interface module 116 then forwards the queried information to the engine module 110. If further processing is required, the engine module 110 processes the data received from the database interface module 116 by applying logic derived in part from the user's LKD, contained in the knowledge depository module 108 about the user's past activities on the Trading System 104. For example, the engine module 110 may extract one or more features from a known feature. After further processing, the engine module 110 may return the processed information to the GUI module 106 for viewing by the viewer at terminal 100. Alternatively, if no further processing of the information received by the engine module 110 from the database interface module 116 is needed, the engine module 110 may send the information directly to the GUI module 106 for viewing by the user at terminal 100.

The information returned to the user accessing the Trading System 104 by way of the terminal 100 may include one or more of search results, retrieval of financial information, analysis performed by the Trading System 104, results of processing performed by the Trading System 104, or advice or suggested decisions generated by the Trading System 104. In the embodiment illustrated in FIG. 1, the Trading System 104 does not include the financial database 102. Rather, the financial database 102 exists separate from the Trading System 104, and the Trading System 104 merely interfaces with the external financial database 102 by way of the Internet and/or another suitable network. In the embodiment illustrated in FIG. 1, the database interface module 116 is configured to interact with the financial database 102 in a suitable way, depending on the implementation and the interface requirements of the financial database 102.

Figure 2:
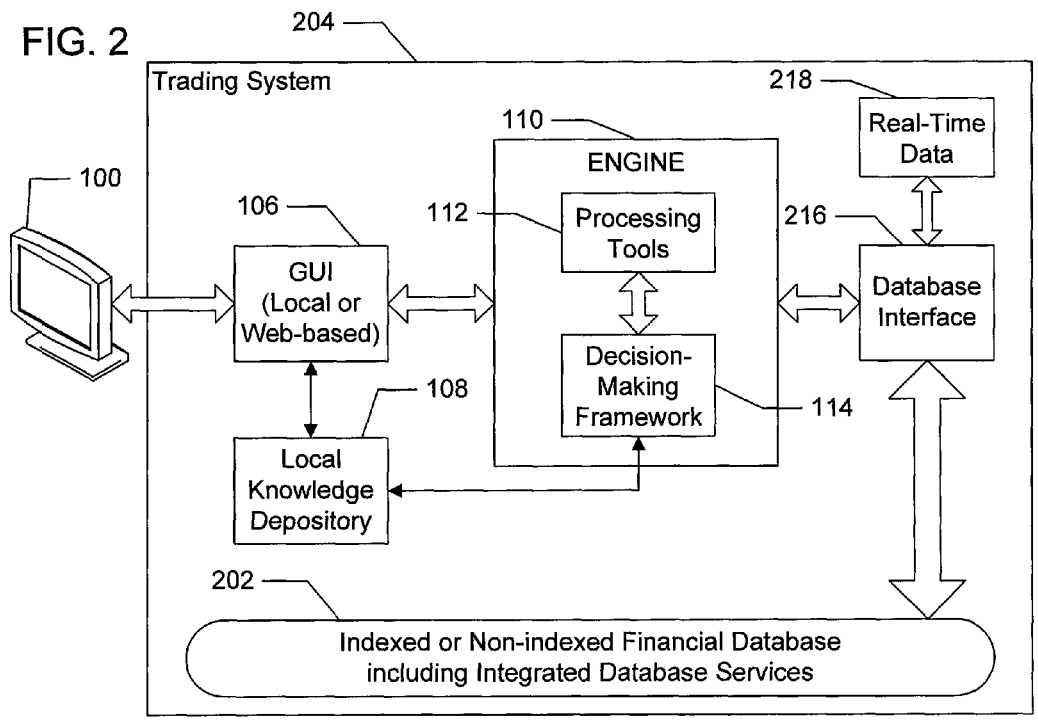
FIG. 2 is schematic diagram of an alternative example system for performing intelligent, content-based searching, retrieval, analysis, processing, and decision making.

FIG. 2 is a schematic diagram illustrating a different example implementation of the system described herein, wherein an indexed version of the financial database 102 as described with respect to FIG. 1 is maintained within the Trading System 204 as financial database module 202. As with the financial database 102, the financial database 202 may be a flat database containing data relating to financial objects, or may be an indexed database containing information about financial objects and the features contained within the financial objects. In the latter embodiment, the indexed database 202 is created by the trading system 204, as discussed in detail below.

FIG. 2 indicates that a user utilizes a terminal 100 to interface with financial database module 202. However, FIG. 2 illustrates that Trading System 204 contains all the modules contained in Trading System 104 illustrated in FIG. 1 and also includes the financial database module 202 within the Trading System 204. The financial database module 202 is stored within the Trading System 204 as an indexed version of some external financial database, and is indexed as described below. The modules described above with respect to FIG. 1 and Trading System 104 function identically for Trading System 204. However, the database interface module 216 is implemented differently in Trading System 204. In Trading System 204, the database interface module 216 does not need to include a protocol for interfacing with some non-indexed financial database, maintained outside the Trading System 204. Rather, the database interface module 216 includes the ability to interface with the financial database module 202 that represents the indexed version of the external financial database. Database interface module 216 performs the same function—that is, it sends requests to and receives responses from the financial database module 202—as it does in Trading System 104. However, in Trading System 204, the financial database module 202 is implemented and maintained by the system administrator in change of Trading System 204. This may mean that database interface module 216 may not need to include the ability to access a database by means of the Internet and/or another suitable network. For example, the financial database module 202 may reside in the same memory space as database interface module 216 and may be accessible referencing a certain memory location. Alternatively, the financial database module 202 may reside in a different physical memory space than one or more of the modules included in Trading System 204. In this case, the database interface module 216 may access the financial database module 202 by way of the Internet or other suitable network.

The database 202 may also include the data contained in a commercially available (i.e., the raw data). In this example, the database 202 is indexed by feature and also includes the raw data itself or a pointer to the raw data. Because in this embodiment the database 202 may include raw data, it should be appreciated that the database 202 included in the Trading System 204 may provide a user with the same integrated database services available to a user directly using a commercially available database. For example, the database 202 may provide the user the same links that would be available if the user was viewing data about a security's performance provided by YAHOO™ Finance (e.g., the same search functionality or real-time news availability).

Further, as illustrated in FIG. 2, the Trading System 204 may include a real-time data module 218. In one embodiment, the database interface module 216 provides an interface not only to the locally-stored indexed database 202, but also to the real-time data module 218. Data available in the database 202 may not be updated real time—that is, it may contain historical data. Because traders frequently make decisions based on real-time data, the system and methods disclosed may provide the trader with an interface to a real-time data source. The real-time data source may be contained within the Trading System 204 as illustrated, or may be externally located. In the latter case, the real-time data module 218 provides an interface to enable the Trading System 204 to access external, real-time data sources. It should be appreciated that the real-time data source 218 may enable more accurate decision support by generating decisions based partly on real-time data, as will be discussed in more detail below.

Referring to FIGS. 1 and 2, from the perspective of the user utilizing a terminal 100 to access either Trading System 104 or the Trading System 204, the Trading Systems 104 and 204 appear identical and the information retrieved from the financial databases 102 or 202 is processed and displayed in an identical fashion. The Trading System 104 may be implemented entirely on a client device, whereas the Trading System 204 may be implemented partly on a client device and partly on a Web server, or the Trading System 204 may be implemented entirely on a Web server. In this embodiment, the user at terminal 200 need not install software on any local client device. Rather, the terminal enables the user to log on to the Trading System 204 by accessing a Web server.

In one embodiment, as a prerequisite to performing content-based processing on time series data found in a financial database, the system and methods disclosed may include initially indexing the known financial database to enable quick and easy content-based manipulation of the data. It should be appreciated that in different embodiments, the data contained in the financial database need not be indexed; rather, as discussed below, the data in the financial database may be analyzed in its entirety each time content-based processing is performed. In these embodiments, the implementation choice not to index the database may reflect a desire to reduce the processing necessary at system startup by not requiring the entire financial database to be indexed. Further, this implementation may be chosen if the users of the disclosed system and methods will frequently be searching a small, known subset of the data contained in the financial database 102 or 202.

Figure 3:
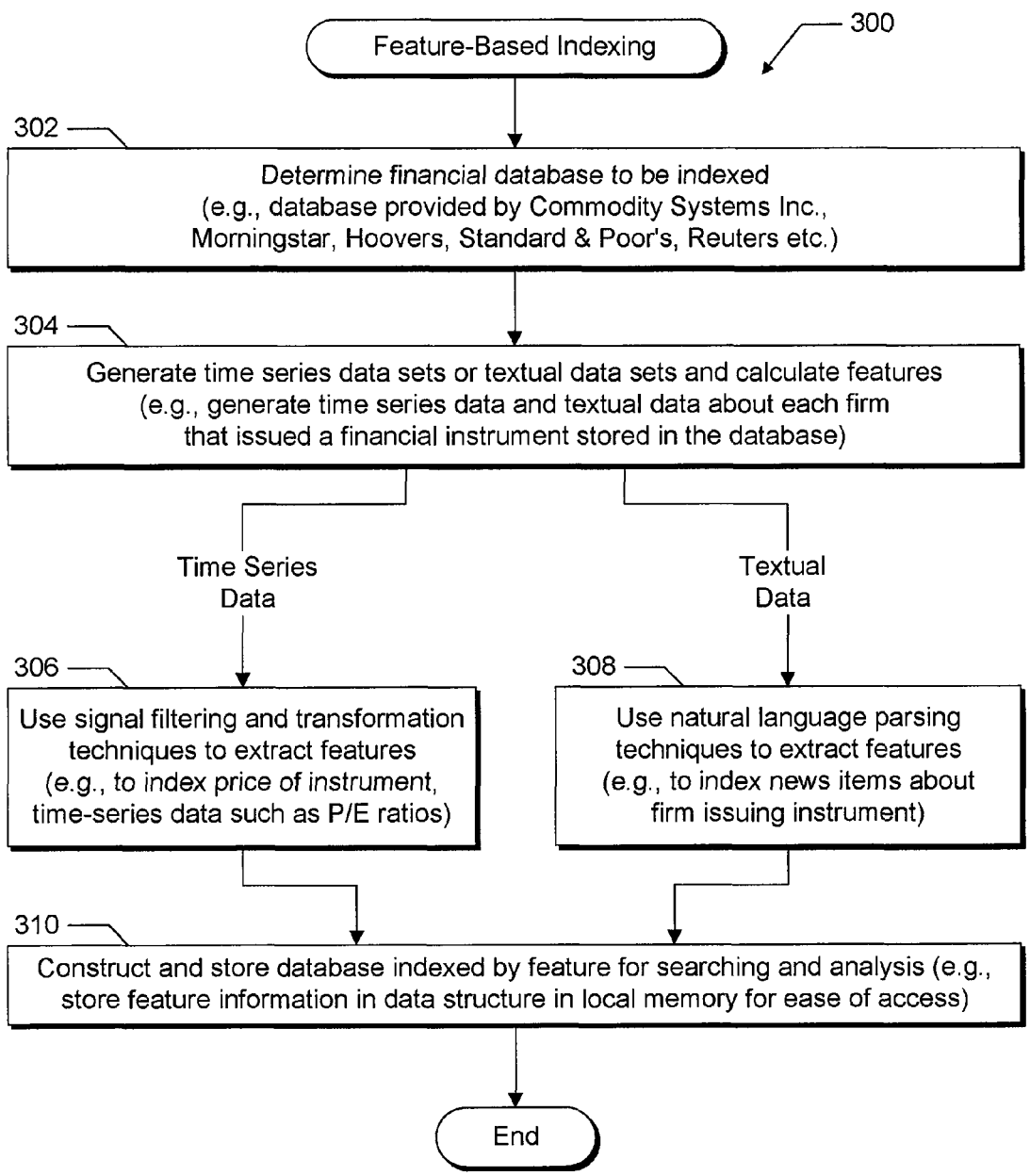
FIG. 3 is a flow chart of an example process for indexing a publicly or privately available database containing financial information based on one or more features contained in a knowledge domain.

FIG. 3 is a flow chart illustrating an example process 300 for indexing a financial database to enable quick and easy content-based searching and analysis. Although the example process 300 for indexing a financial database is described with reference to the flow chart illustrated in FIG. 3, it will be appreciated that many other methods of indexing a financial database are contemplated. For example, the order of many of the blocks may be changed, and many of the blocks described are optional. Moreover, many of the blocks may be performed by one or more different modules than is described in the following detailed description. Additionally, the functions described may be performed by different modules than the modules referred to in the below-enumerated preferred embodiment.

To begin indexing a financial database, a financial database must be selected for indexing (block 302). For example, the database to be indexed may be chosen from the group of financial databases provided by firms such as Commodity Systems Inc., Hemscott, Morningstar, Cannex, Hoovers, Thomson Financial, Standard & Poor's, Reuters, Bloomberg, Interactive Data, and Gradient Analytics, among others.

The selected financial database is indexed by analyzing each record about a financial object contained in the database (block 304). Depending on the type of data contained in the record about the financial object, the system and methods construct either a time series data set or a textual data set about each financial object contained in the database (block 304). For example, if a record in a database contains numerical information about a particular firm, the system and methods disclosed may construct a time series data set including the numerical data (block 304). Alternatively, if the record contains textual information about a firm, the system and methods disclosed may construct a text data set (block 304).

The system and methods disclosed determine the features included in a data set based on whether the data set contains time series data or textual data (blocks 306 and 308). A feature may be any set of characteristics about time series of data. For example, the cyclical nature of a particular time series of data may be a feature, or it may be a feature if a large jump in a time series of data occurs. Thus, the term "feature" is broadly defined to represent characteristics of time series of data that are or may be of interest to a trader. Preferably, features represent properties within data sets that are too complex for a trader to recognize by manual data analysis techniques. If the data sets include time series data sets, the system and methods disclosed use signal filtering and transformation techniques to determine whether the time series data contains any features as defined by the knowledge depository (block 306). For example, if the data includes time series data about the price of an instrument, or about price-to-earnings ratios, the system and methods disclosed may apply a known signal filter to determine whether any features exist. If the data set includes textual data, the system and methods use natural language parsing techniques to determine whether any features are present (block 308). For example, if the data includes text of a news item about a financial object, the system and methods disclosed may apply natural language parsing techniques to determine whether the news item contains any features. The techniques for determining whether any features are present will be described in detail below. It should be appreciated that the system and methods disclosed may also perform the indexing described above based on one or more user preferences. For example, a user preference may be in the form of a feature in which a particular user is particularly interested, or may include information about a past investment decision made by the user. The system and methods thus enable customized indexing that is tailored to an individual user based on the user's past investment decisions and actions within the system.

Finally, the system and methods disclosed construct an indexed database including the features present in the financial data about each financial object (block 310). In different embodiments, the features and the data in which the features were found are both stored locally in an indexed database. In other embodiments, the features are stored locally but the raw data from which the features were determined remains in the non-local financial database. In either case, the system and methods disclosed index the features contained in the data of the financial database to enable easy searching by feature. The features of the various financial objects represented in the financial database may be stored in the indexed database as vectors, and may be referred to as "feature vectors."

In different embodiments, an indexed database of features contained in a locally stored data structure may be updated by repeatedly analyzing and indexing an entire financial database on a given schedule (e.g. once a week). Alternatively, the system and methods disclosed may index the financial database by analyzing each record contained in the database one time, and subsequently indexing only records added to the financial database. For example, if a financial database contains information about each security traded on a give exchange, the database may be indexed so as to include all securities represented by database records in the financial database on a given date. Subsequently, each time a new security is added to the exchange, or each time a currently-traded security is removed from the exchange, the system and methods disclosed may update the indexed database of features to reflect the addition or deletion.

Figure 4:
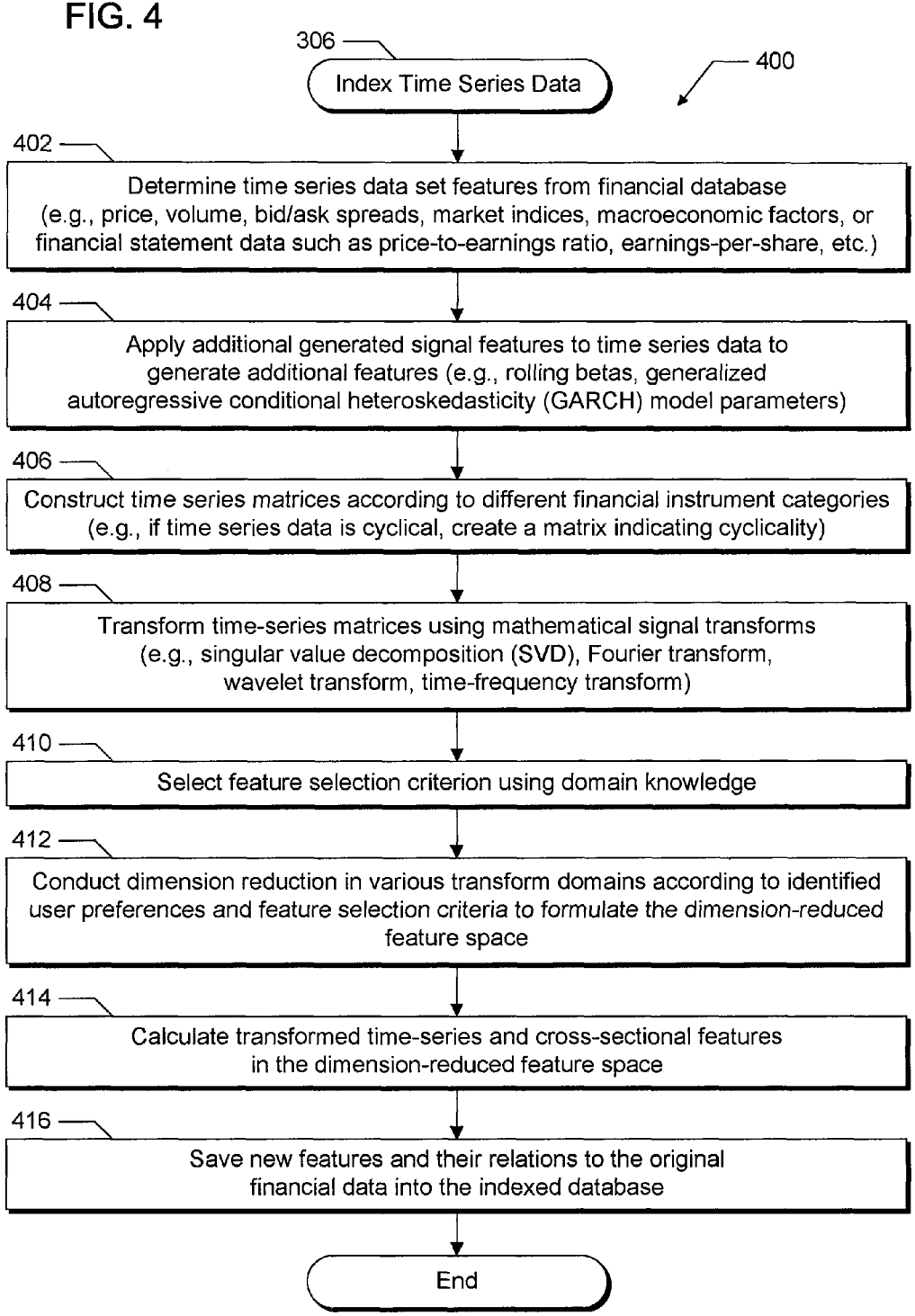
FIG. 4 is a flow chart of an example process for indexing time series data found in a publicly or privately available financial database by extracting features from the time series data.

FIG. 4 illustrates a flow chart of an example process 400 for indexing numerical data about financial objects, as indicated by block 306 of FIG. 3. Preferably, the example process 400 is used only when the system and methods have determined that numerical data needs to be indexed; thus, the example process 400 is preferably performed on time series data about a financial object found in a commercially available financial database. Although the example process 400 for indexing time series data found in a financial database is described with reference to the flow chart illustrated in FIG. 4, it will be appreciated that many other methods of indexing time series data are contemplated. For example, the order of many of the blocks may be changed, and many of the blocks described are optional.

The process 400 for indexing time series data may be performed for each one of many time series data sets found in a financial database. Thus, process 400 begins by determining a time series data set from a financial set to be indexed (block 402). In different embodiments, as discussed above, the time series data set is determined by performing simple queries on a financial database such that all data in the financial database is analyzed serially. Alternatively, queries may be made to the database such that some but less than all of the data is analyzed serially. In either case, time series data such as data about price, volume, bid/ask spreads, or market indices over a period of time is appropriate for indexing (block 402). Similarly, data about a firm's financial statements over a period of time, such as data about price-to-earnings ratios or earnings-per-share ratios, are appropriate for indexing (block 402).

For each determined time series data set, the system and methods may apply additional generated signal functions to transform one or more sets of time series data (block 404). For example, the system and methods may calculate rolling betas for a time series data set, or may apply generalized autoregressive conditional heteroskedasticity (GARCH) model parameters to a time series data set (block 404). It should be appreciated that the application of these additional signal functions is optional, and the system and methods disclosed may not perform this step during time series data indexing.

Based on the transformed or non-transformed time series data, the system and methods disclosed determine whether any features are contained in the time series data (block 406). For each feature determined to be present in a time series data set, the system and methods may create a time series matrix identifying the feature present and identifying the time series data in which the feature was found. For example, if a time series data set contains cyclical data, the system and methods may create a time series matrix including a representation of the cyclicality feature and including the cyclical time series data. In different embodiments, the time series matrix may include an identifier of the feature as well as the raw data contained in the time series data set, or may include information about the feature contained in the time series data set and a remote reference to the location of the time series data.

The system and methods disclosed may also transform various time series data set using known mathematical signal transforms to generate additional features (block 408). For example, the system and methods disclosed may apply a singular value decompression (SVD), a Fourier transform, a wavelet transform, or a time-frequency transform to a time series data set (block 408). Depending on the results of the application of these transforms, additional features may be generated about each time series data set (or, alternatively, about the transformed data set) and stored in the indexed database. Applying additional transforms enables the system and methods to generate and determine features that are too complex for a trader to identify, or that are unknown to a trader.

Once the features from all the time series data have been determined, the system and methods disclosed apply any domain knowledge to the determined features (block 410). For example, the system and methods disclosed may identify common search patterns of interest to users based on domain knowledge contained in an LKD (block 410). Additional identification of common search patterns of interest may be achieved using supervised and unsupervised learning techniques (block 410).

The system and methods in one embodiment also conduct dimension reductions in various transform domains according to identified user preferences and feature selection criteria (block 412). These dimension reductions are conducted based in part on users' past identification of feature selection criteria, which may be contained in the LKD. In one embodiment, the dimension reductions serve to reduce the data stored in the indexed database to only data of interest to the users of the system and methods. Based on the dimension reductions, the system and methods may also calculate transformed time series data and features in the new dimension reduced feature space (block 414). It should be appreciated that blocks 412 and 414 may be combined such that the dimension reduction and calculation of transformed time series data sets may be done substantially simultaneously. Moreover, the dimension reduction and calculation of transformed time series data sets may in various embodiments not be performed at all.

Finally, the features detected in the data contained in the financial database are stored, along with the time series data in which the features are found, in an indexed database (block 416). The indexed database may be stored locally or remotely, but the Trading System engine is operable to search and manipulate data contained in the indexed database. In different embodiments, the features are stored in the indexed database but the time series data in which the features are found may not be—in these embodiments, the database may simply store a pointer or other data structure indicating the feature's relation to the time series data.

It should be appreciated that the feature-indexed database enables the system and methods disclosed to search for and manipulate time series data based on the features contained within the data. Additionally, as discussed below, the data stored in the LKD may be stored in terms of features, such that easy application of feature information in the LKD to features found in the financial database, stored in the indexed database, is possible.

Figure 5:
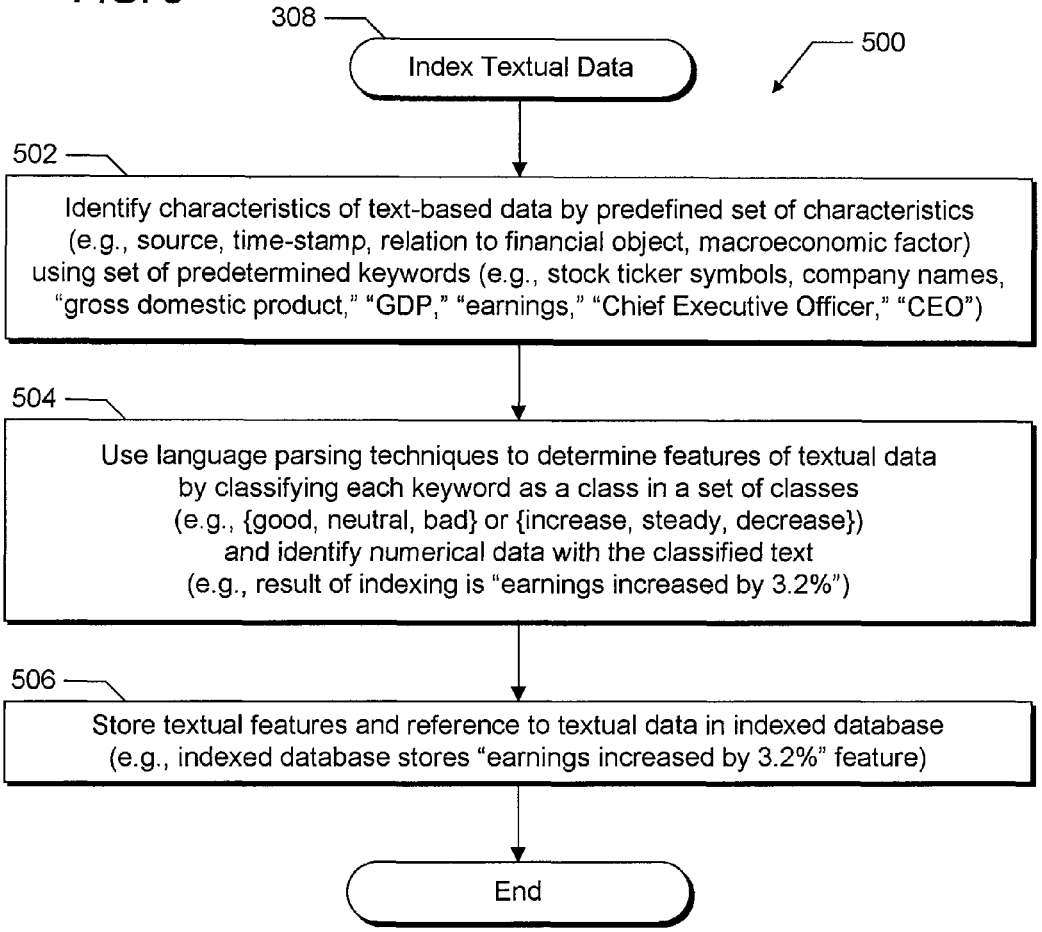
FIG. 5 is a flow chart of an example process for indexing textual data found in a publicly or privately available financial database by extracting features from the textual data.

FIG. 5 illustrates a flow chart of an example process 500 for indexing textual data contained in a financial database as indicated by block 308 of FIG. 3. Although the example process 500 for indexing a textual data in a financial database is described with reference to the flow chart illustrated in FIG. 5, it will be appreciated that many other methods of indexing textual data in a financial database are contemplated. For example, the order of many of the blocks may be changed, and many of the blocks described are optional.

FIG. 5 illustrates an example process 500 for indexing textual data contained in a financial database as indicated by block 308 of FIG. 3. During indexing, if the system and methods determine that a database record in a financial database includes textual data such as a press release or a news story, a parsing algorithm is applied to the textual data to determine whether any of a predefined set of keywords are present in the textual data (block 502). Using any keywords found, the system and methods disclosed identify any characteristics of the textual data present in the text (block 502). For example, by searching for keywords such as stock ticker symbols, company names, gross domestic product, earnings, or Chief Executive Officer, the system and methods disclosed identify characteristics of the textual data such as the source of the data, its relation to a financial object, the time-stamp of the data, or a macroeconomic factor referenced in the data (block 502).

Once the keywords present in a given database record have been established, the system and methods disclosed use known natural language parsing techniques to associate a quantifying modifier with the keyword for a particular database record (block 504). Such quantifying modifiers typically include one of a set of modifiers that indicate different quantities of the same characteristic—for example, sets of quantifying modifiers may include {good, neutral, bad} or {increase, steady, decrease}. The quantifying modifier may be any modifier appropriate to modify the keyword representing a feature of the textual data. The keyword combined with the quantifying modifier results in a finding of a feature of the textual data. Where appropriate, the system and methods also parse the textual data to determine whether to associate a numerical indication of the quantifying modifier, for example "increase by 3.2%" (block 504). When such a numerical indication is applied, the numerical indication is included in the feature. Thus, a fully parsed textual record may result in a feature of a textual database record stating that "the price of Company X's stock increased by 3.2%" or that "the shareholders of Company Y feel that the CEO is doing a bad job." It should be appreciated that the sets of quantifying modifiers may include more than three options, and may quantify any conceivable characteristic found in a financial database based on the text contained in a text data item. The features found in a textual database record are stored in the indexed database along with a reference to the data in the financial database (block 506). As discussed above, the textual data may be stored along with the feature, or a reference to the textual data may be stored in the indexed database. Either way, the indexed database enables fast, easy searching and manipulation of data contained therein based on features of textual data.

It should be appreciated that the system and methods disclosed enable content-based searching by enabling a user to identify a content-based query item. The content-based query item may be any suitable input which the system and methods may analyze to determine whether a feature is present in the content-based query item. For example, the content-based query item may be a feature, an example financial object including an example firm, a computer-generated or hand-drawn graph or image which describes a pattern in which one or more features are contained, or a description of one or more features. The use of example financial objects and example patterns as content-based query items is described immediately below.

The system and methods disclosed enable a user to utilize a database of financial information indexed by features contained in the data to search the database by example. For example, if a trader determines that Sears Holding Corp. is, in his or her opinion, a good buy opportunity based on a range of pricing and financial performance measure (e.g., its price-to-earnings (P/E) ratio or its market-to-book value), the system and methods disclosed enable the trader to indicate that he or she would like to search the indexed database for firms similar to Sears Holding Corp. Though it would be possible to use keyword and rule-based searching to perform such a search, the task would be laborious, as the trader would have to input the exact values of the desirable financial features (e.g., a price-to-earnings ratio of 11). Moreover, current keyword and rule-based searching does not provide flexibility—that is, if a trader specifies that the minimum P/E ratio to be searched is 11, a P/E ratio of 10.9 would be excluded, though a firm with such a P/E ratio may useful to the trader. By searching for features included in the indexed database, the system and methods disclosed rank potential results according to a similarity score, and enable a user to assess the correlations.

Figure 6:
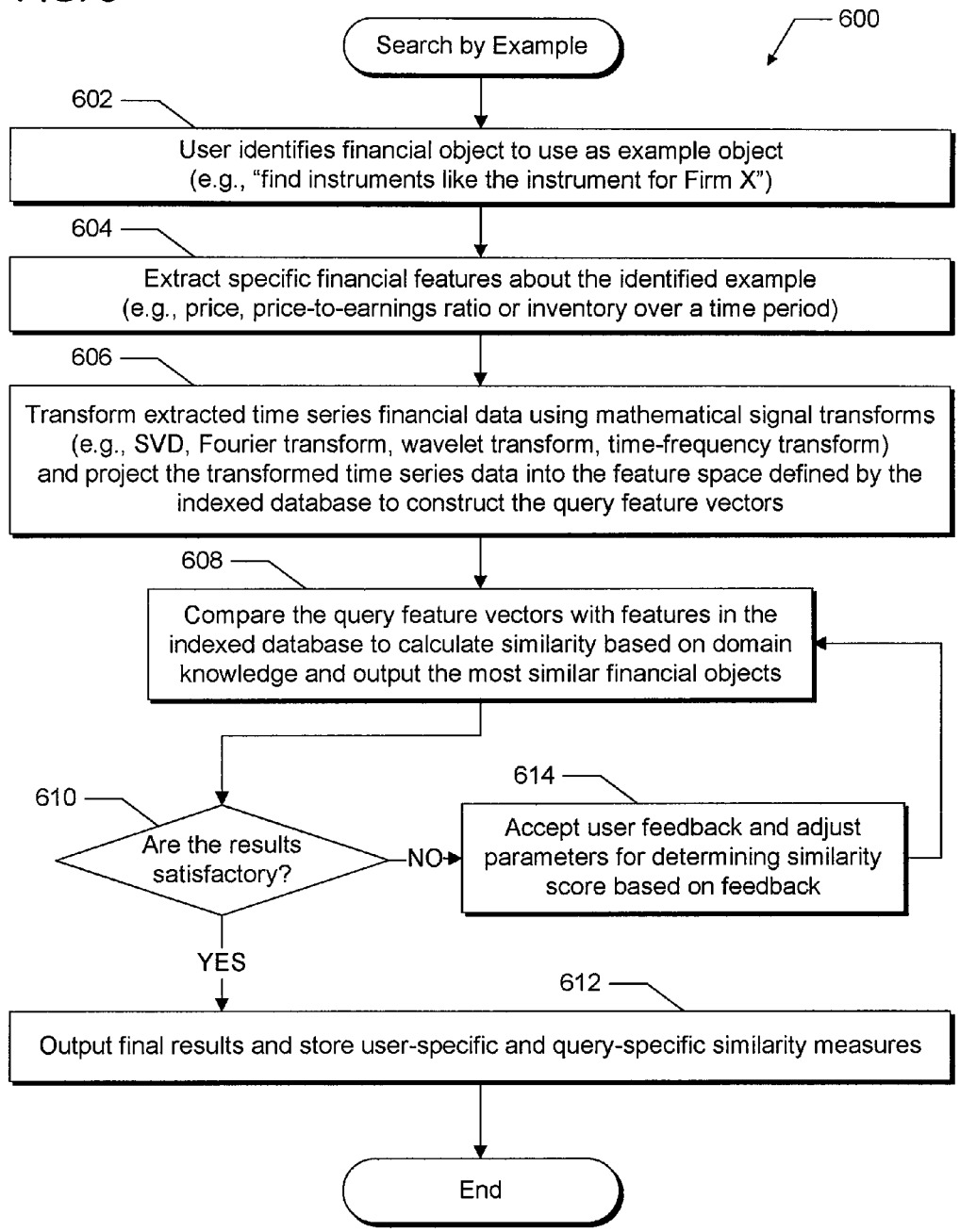
FIG. 6. is a flow chart of an example process for performing intelligent, content-based searching based on features contained in a financial database relating to an example firm provided by a user.

FIG. 6 is a flow chart of an example process 600 for intelligently searching a financial database based on an example financial object. Although the example process 600 for searching based on an example financial object is described with reference to the flow chart illustrated in FIG. 6, it will be appreciated that many other methods of searching based on an example financial object are contemplated. For example, the order of many of the blocks may be changed, and many of the blocks described are optional.

The example process 600 for intelligently searching a financial database based on an example financial object begins when a user identifies a financial object to use as an example (block 602). For example, a user may indicate to that he or she would like to search an indexed financial database for firms similar to Sears Holding Corp. (block 602). Alternatively, the user may specify an identifying characteristic of a financial object without specifying the name of the object such that the system performs an intelligent search to find financial objects with similar characteristics. It should be appreciated that a search may be performed on any type of financial object stored in the indexed database, and that the disclosure is not limited to searching based on example firm names.

The name of the identified financial firm in one embodiment is passed to the engine module 110, where the engine module applies the domain knowledge appropriate for the user to extract specific financial features about the identified financial object (block 604). For example, the engine module 110 may extract features about the price, price-to-earnings ratio, or inventory time series associated with Sears Holding Corp. (block 604). In different embodiments, the features extracted depend upon the type of financial object specified, as certain types of financial objects cannot have certain features. It should be appreciated that the engine module 110 may also apply one or more user preferences, in the form of features or past user decisions, to further define the features which are extracted from the example financial object.

Once the system and methods have extracted the features of the example financial object, the time series data sets representing the features may have different mathematical signal transforms applied to them (block 606). For example, the system and methods may apply SVD, Fourier transforms, wavelet transforms, and/or time-frequently transforms to the time series data about the example financial object (block 606). The system and methods may project the transformed signals into the feature space defined in the construction of the indexed database (i.e. the feature space defined by the domain knowledge) to create a set of query vectors representing the features of the example financial object (block 606). It should be appreciated that the features contained in the example financial object need not have mathematical signal transforms applied. Indeed, some features (e.g., textual features such as news items) cannot have mathematical signal transforms applied to them. The system and methods may select the additional transforms to apply to the extracted features based in part on the user preferences, as discussed above.

After the query vectors have been defined, the query vectors are applied to the features (which in one embodiment are represented as feature vectors) in the indexed database (block 608). A similarity measure developed by training and domain knowledge is used to compare the query vectors with each feature vector in the indexed database (block 608). Moreover, a similarity score is calculated based on the training and domain knowledge for the feature vectors in the indexed database (block 608). The system and methods in one embodiment select a predetermined number of potential matches (i.e., six financial objects) to output and display to the user based on the similarity between the potential matches and the query vectors (block 608). In addition to outputting a representation of the financial object, the system and methods disclosed may also output the calculated similarity score (block 608). It should be appreciated that the similarity score may also be based, in part, on one or more user preferences stored by the system and methods disclosed The system and methods disclosed enable a user to assess the similarity or correlation between the outputted results and the searched feature or features of the example financial object (block 610). The system and methods disclosed may provide a mechanism to enable the user to input a ranking or score about each returned financial object. If the ranking or scores indicated by the user are sufficiently high that the results are satisfactory to the user (block 610), the system and methods disclosed output the final results and store any user-entered similarity rankings or scores associated with the user and the query (612).

If the user ranking or scores indicate that the results are unsatisfactory (block 610), the system and methods store the ranking and scores in the domain knowledge, and perform a new comparison between the example financial object and the features contained in the indexed database based on the updated domain knowledge (block 614). The new results are outputted to the user and the similarity scoring process (block 610) begins again.

The system and methods disclosed also enable a user to search for features by providing a pattern to be matched. For example, if a user wishes to input a chart indicating a desired pattern for volume of a financial instrument traded over a given time period, the system and methods enable the user to do so. By simply drawing or uploading an envisioned pattern, the system and methods disclosed enable a user to search, for example, for all firms exhibiting a similar pattern of P/E ratios in a particular industry over the past 10 years. Moreover, because the knowledge base retains the user's inputs as to the similarity or applicability of a set of results, the logic used to assess "similar pattern" is customized to the user performing the search.

Figure 7:
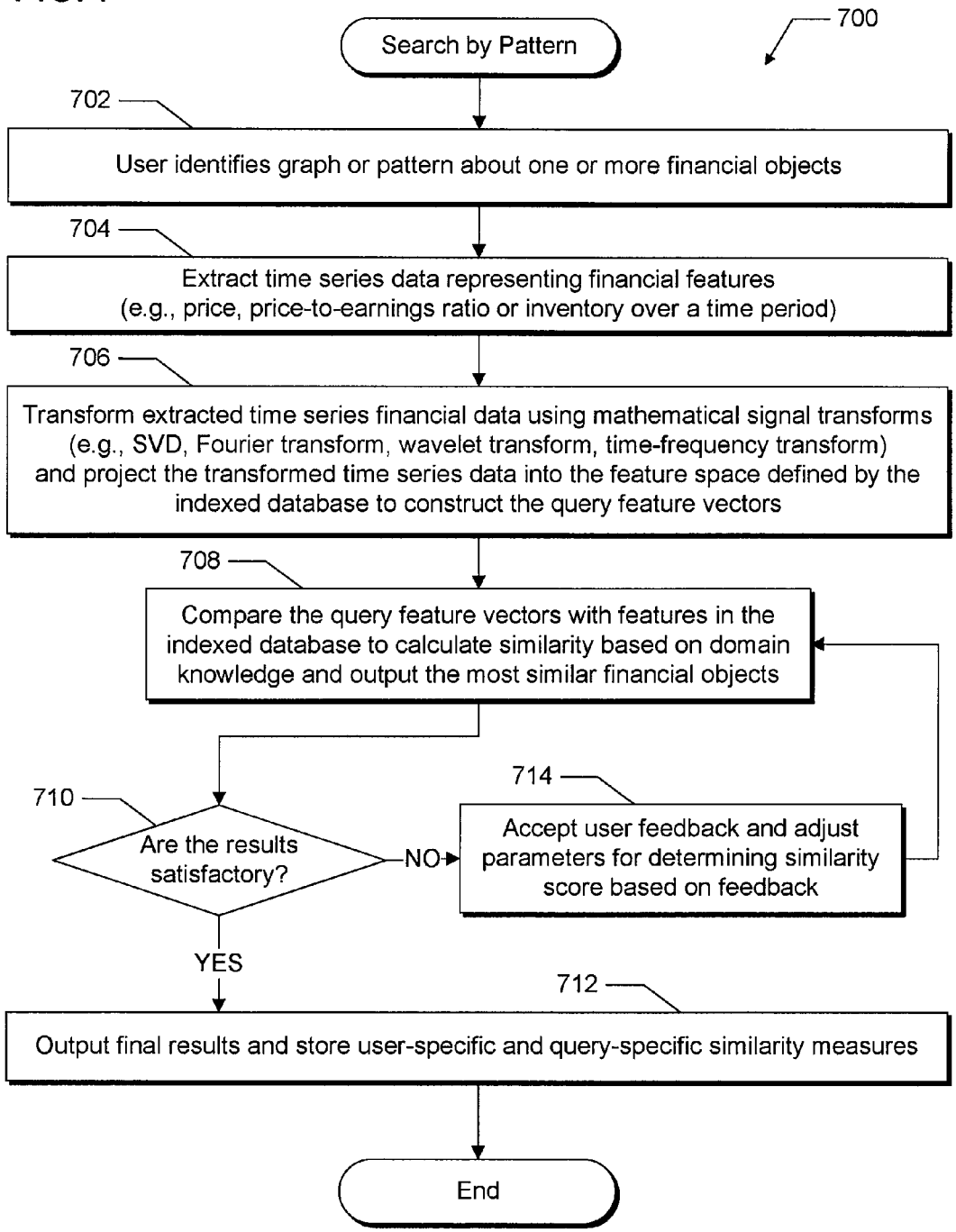
FIG. 7 is a flow chart of an example process for performing intelligent, content-based searching based on features indicated by a pattern drawn by or provided by a user.

FIG. 7 illustrates a similar intelligent search process to the process 600 illustrated by FIG. 6. However, FIG. 7 illustrates a flow chart of an example process 700 for intelligently searching a financial database based on a pattern. Although the example process 700 for intelligently searching a financial database based on a pattern is described with reference to the flow chart illustrated in FIG. 7, it will be appreciated that many other methods of intelligently searching a financial database based on a pattern are contemplated. For example, the order of many of the blocks may be changed, and many of the blocks described are optional.

The example process 700 for intelligently searching a financial database based on a user-input pattern begins when a user identifies pattern to use as a search criterion (block 702). For example, a user may draw a chart indicating the shape of one or more specific financial features, such as price or price-to-earnings ratio time series data (block 702). Alternatively, the system and methods may enable the user to upload a chart containing the shape of a time series data set to be searched, or may enable the user to upload a spreadsheet or other numerical chart containing time series data to use as an example pattern. It should be appreciated that a search may be performed on a time series data set about any type of financial object stored in the indexed database, and that the disclosure is not limited to searching based on charts of price or price-to-earnings ratio. Additionally, it should be appreciated that the search based on a pattern may be based in part on one or more user preferences as disclosed above with respect to searching by example.

The chart or uploaded data in one embodiment is passed to the engine module 110, where the engine module applies the domain knowledge appropriate for the user to extract specific financial features about the identified financial object (block 704). For example, the engine module 110 may extract the time series data represented by a hand-drawn or uploaded chart such that the features illustrated by the chart can be ascertained (block 704). In different embodiments, the features extracted depend upon the type of financial object specified, as certain types of financial objects cannot have certain features.

Once the system and methods have extracted the features of the example financial object, the time series data sets representing the features may have different mathematical signal transforms applied to them (block 706). For example, the system and methods may apply SVD, Fourier transforms, wavelet transforms, and/or time-frequently transforms to the time series data representing the example financial object (block 706). The system and methods may project the transformed signals into the feature space defined in the construction of the indexed database (i.e. the feature space defined by the domain knowledge) to create a set of query vectors representing the features of the example financial object (block 706).

After the query vectors have been defined, the query vectors are applied to the features (which in one embodiment are represented as feature vectors) in the indexed database (block 708). A similarity measure developed by training and domain knowledge is used to compare the query vectors with each feature vector in the indexed database (block 708). Moreover, a similarity score is calculated based on the training and domain knowledge for the feature vectors in the indexed database (block 708). The system and methods in one embodiment select a predetermined number of potential matches (i.e., six financial objects) to output and display to the user based on the similarity between the potential matches and the query vectors (block 708). In addition to outputting a representation of the financial object, the system and methods disclosed may also output the calculated similarity score (block 708).

The system and methods disclosed enable a user to assess the similarity or correlation between the outputted results and the searched feature or features of the example financial object (block 710). The system and methods disclosed may provide a mechanism to enable the user to input a ranking or score about each returned financial object. If the ranking or scores indicated by the user are sufficiently high that the results are satisfactory to the user (block 710), the system and methods disclosed output the final results and store any user-entered similarity rankings or scores associated with the user and the query (712).

If the user ranking or scores indicate that the results are unsatisfactory (block 710), the system and methods store the ranking and scores in the domain knowledge, and perform a new comparison between the features represented by the example pattern and the features contained in the indexed database based on the updated domain knowledge (block 714). The new results are outputted to the user and the similarity scoring process (block 710) begins again.

Figure 8:
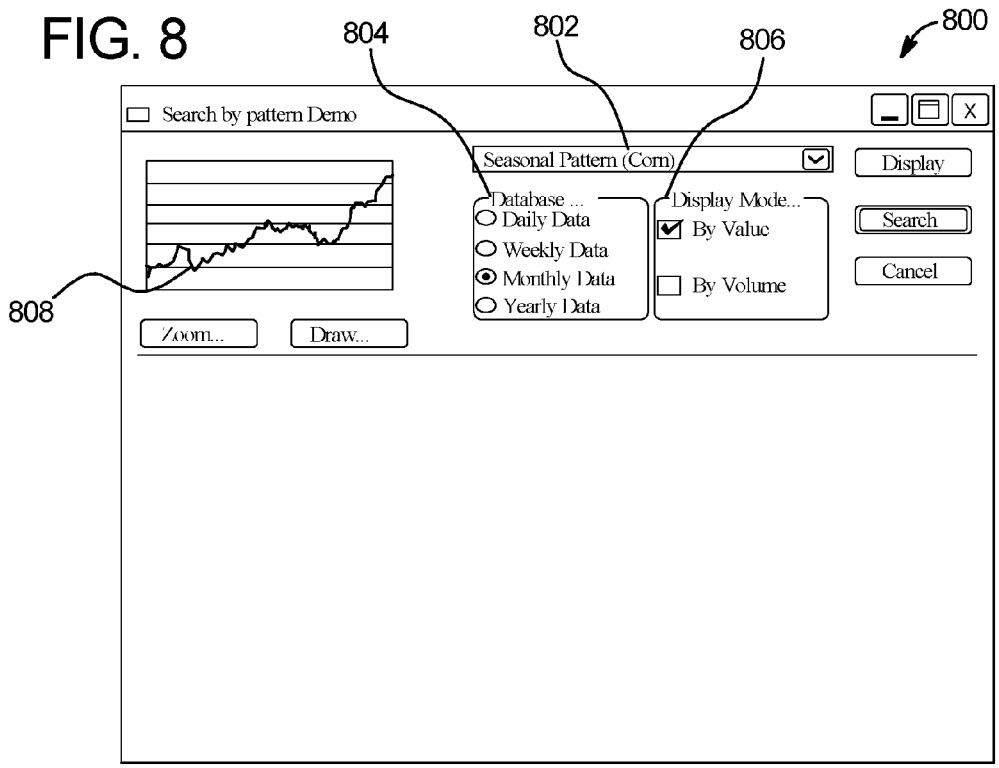
FIG. 8 is a screen shot of an example interface for enabling a user to draw or otherwise provide a pattern on which to perform intelligent, content-based searching.
Figure 9:
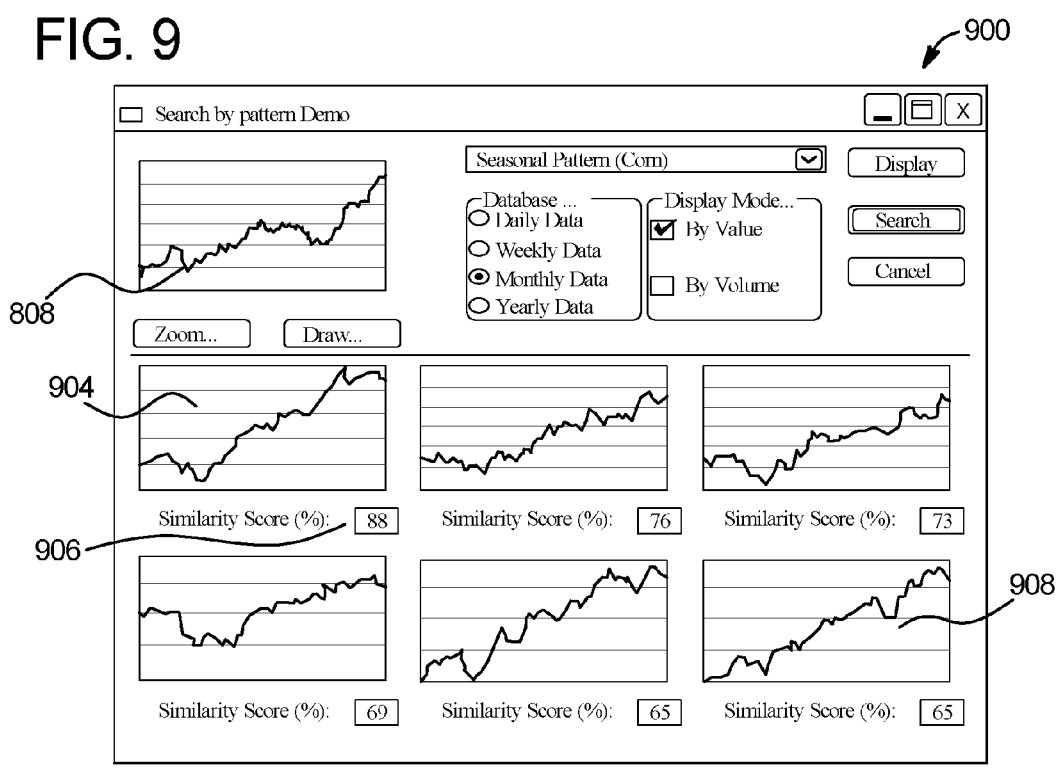
FIG. 9 is a screen shot of an example set of search results based on a user-drawn or otherwise provided pattern and an interface for enabling the user to provide feedback about the correlation between the search results and the drawn search pattern.

FIGS. 8 and 9 illustrate screen shots of an example implementation of the searching by pattern process 700 discussed with reference to FIG. 7. Referring to FIG. 8, a screen shot 800 of an example interface displayed to a user is illustrated. The user in the illustrated embodiment is a commodities trader. The system and methods disclosed enable the trader to select the commodity whose data the trader would like to search 802. In this embodiment, the commodity trader has selected to search data relating to seasonal pattern (corn). It should be appreciated that the system and methods disclosed may enable the trader to select from a list of stock names, markets, commodities, or any other relevant financial objects.

The system and method disclosed may provide the trader the opportunity to select the database to search 804. In the illustrated example embodiment, the options about which database to search enable the trader to define the time period for which to search (i.e., daily, weekly, monthly, or yearly data). It should be appreciated that any suitable database selection is contemplated by the instant disclosure. Finally, the system and methods provide the trader the ability to select the display mode 806. In the illustrated embodiment, the trader may select between the value of corn traded and the volume of corn traded.

The system and methods disclosed may enable a user to determine the x-axis and the y-axis of the graph the user wishes to use as an example. In the embodiment illustrated in screen 800 of FIG. 8, the x-axis is defined by the database options 804 such that the user may define the time period of the drawn graph. The y-axis is defined by the option to display the value of corn or the volume of corn sold 806. Thus, the system and methods disclosed may provide the user with any appropriate choices for the x-axis and the y-axis, depending on the type of data 802 for which the user wishes to search using a user-drawn pattern.

The system and methods disclosed enable the trader in one embodiment to draw a graph to use as search input 808. In a further embodiment, the trader may be provided with an import option that allows the user to select a file containing a digital representation of the shape of the graph such that the trader does not need to draw the graph by hand. In still another embodiment, the system and methods disclosed enable a trader to hand-draw a graph on paper, scan the paper into a personal computer, and use the scanned drawing as the basis for the pattern-based search disclosed.

FIG. 9 illustrates a screen shot indicating the results of the pattern-based search based on the pattern 808 drawn by the trader. As illustrated in screen shot 900, the trader's drawn pattern 808 is displayed to provide the trader a quick and easy way to visually compare the results of the pattern-based search. Additionally, six potential search matches are displayed to the trader and are arranged in the suggested order of relevance, with the most relevant result 904 being placed in the upper left result location and the least relevant result 908 being placed in the lower right result location. In one embodiment, the results screen 900 also provides the trader with one or more input boxes 906. The input boxes 906 enable the trader to indicate the similarity score as a percentage. Thus, the trader inputs a value indicating the trader's assessment of the extent to which the result corresponds to the user-defined pattern 808. The input boxes 906 may in different embodiments be check boxes that enable a trader to make a binary decision whether the result is relevant or not. Based on the check boxes 906 selected by the trader, the system updates its domain knowledge relative to the trader to further refine future searches, as discussed above.

The system and methods may enable automatic analysis of data customized to the user's preferences. For example, the knowledge base may build up sufficient information based on the user's decision history, similarity scores, or other input information to recognize that certain features or patterns of interest are of particular interest and use to the user. For example, the knowledge base may enable the system and methods to determine that a sudden change in the stock price or volume triggered by a news item is of particular interest to a user. Based on these determined patterns of interest, the system and methods may automatically or on a user's command search the features of the financial objects in the indexed database to determine whether any of the indexed features contain the features of interest to the user. These determinations may be made in any suitable way, including employing signal processing and pattern analysis algorithms. The results may then be provided to the user so as to enable the user to provide feedback assigning relevancy measures to the results. Alternatively, the system and methods may analyze the decisions the user makes based on the data provided to the user as a result of the automatic analysis to determine the relevance of the results. Either way, the information provided (explicitly or implicitly) by the user enables customization of the detection criteria for the user.

The system and methods disclosed also enable users to perform sophisticated processing on financial data by applying advanced signal processing techniques to features contained in data. For example, the system and methods disclosed enable a user to detect and remove the effects of any data series on another data series. This may enable a user to filter out the effects of inflation or other macroeconomic factors on a set of data, to enable the system and methods (or the user) to more easily detect cyclic patterns in the data. The user may apply any appropriate processing method including noise removal of stock price or volume data, noise removal of other financial ratios and/or data, customized trend removal from financial data, customized filtering of financial data, customized modeling of financial data, or any other desired content-based processing of financial data. It should be appreciated that the processing is performed by applying digital signal processing and/or pattern analysis algorithms, so any appropriate digital signal processing or pattern analysis algorithm may be used to perform content-based processing. Moreover, the system and methods disclosed may enable detection of abnormal patterns and automatic correlation of the abnormal patterns with market news contained in the indexed database. Since the system and methods learn from a user's past searches and processing requests, the system and methods may automatically process data according to a user's preferences to enable easier identification of certain features of the data.

Figure 10:
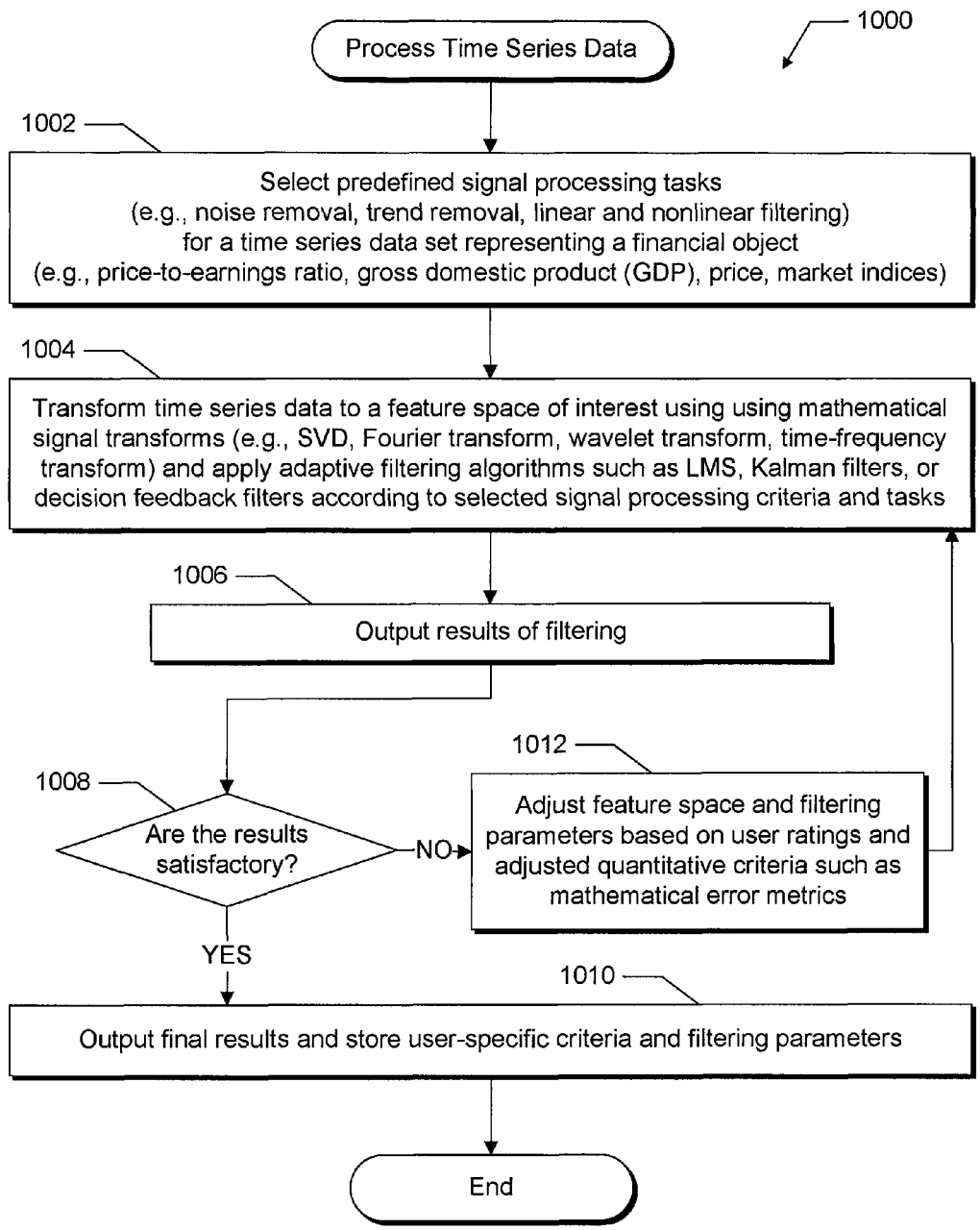
FIG. 10 is a flow chart of an example process for analyzing data about a financial instrument based on acquired domain knowledge.

FIG. 10 illustrates an example process 1000 for performing intelligent, content-based processing of financial information. Although the example process 1000 for performing content-based processing of financial information is described with reference to the flow chart illustrated in FIG. 10, it will be appreciated that many other methods of performing content-based processing are contemplated. For example, the order of many of the blocks may be changed, and many of the blocks described are optional. Moreover, many of the blocks may be performed by one or more different modules than is described in the following detailed description. Additionally, the functions described may be performed by different modules than the modules referred to in the below-enumerated preferred embodiment.

The example process 1000 for performing intelligent, content-based financial information processing begins when a user at terminal 100 requests processing. The user may select one or more predefined signal processing tasks to perform on one or more time series data sets (block 1002). For example, the user may elect to perform a task such as noise removal, trend removal, or linear or nonlinear filtering on time series data such as price-to-earnings ratio for a given firm (block 1002). The user may select the financial object on which to perform processing based on one or more of the financial objects about which features are stored in the indexed database. Some of the signal processing tasks may not be applicable to all features about all financial objects in the indexed database. In different embodiments, the system and methods may select signal processing tasks based on one or more user preferences, such as a feature or a past investment decision.

After the user selects the time series data and the appropriate processing, the system and methods disclose apply one or more mathematical signal transforms to a feature space of interest (i.e., the feature space including the object which the user selected) (block 1004). For example, the system and methods may apply SVD, Fourier transforms, wavelet transforms, or time-frequency transforms to the time series data set selected by the user (block 1004). The system and methods also apply adaptive filtering algorithms such as LMS, Kalman filters, or decision feedback filters to the time series data set selected by the user (block 1004). These mathematical signal transforms and filters may be applied based on the selected type of processing, based on the domain knowledge about the user requesting the processing (i.e., the user preferences), or based on a combination of both factors. After the application of the transforms and filters, the results are output to the user (block 1006).

The system and methods then provide the user the opportunity to indicate whether the results of the filtering are satisfactory (block 1008). If the user indicates the results are satisfactory, the system and methods output the final results and store the request, the results, and the transforms and filters applied to the feature space of interest as part of the domain knowledge (block 1010). If the user indicates that the results of the filtering are unsatisfactory (block 1008), the system and methods enable the user to rate the results of the filtering and provide adjusted quantitative criteria such as mathematical error metrics (block 1012). Based on the supplied feedback, the system and methods disclosed adjust the feature space of interest and the filtering parameters (block 1012). Using the new parameters and feature space of interest, the system and methods again apply the transforms and filters (block 1004), output the results (block 1006), and enable the user to indicate whether the results are satisfactory (block 1008). This process is repeated until the user indicates that the results are satisfactory (block 1010).

For example, the domain knowledge may determine, or the user may explicitly request, that the statistical noise be removed from a time series data set about a particular financial object. Based on the processing explicitly commanded by the user or determined by the domain knowledge, the engine module 110 applies a digital signal processing algorithm to the feature space in representative of the time series data. For example, a noise-reducing algorithm may be applied to a set of data points about a particular financial object.

After applying the digital signal processing algorithm, the engine module 110 may display and store the new set of data and may enable the user to provide feedback about the processing by explicitly rating the accuracy of the results. For example, if the engine module 110 removes the noise from a chart of the performance of a certain stock, and the user takes a position in the stock, the domain knowledge may be updated to infer that future similar results from a digital signal processing algorithm favor taking positions in the stock on which the signal processing was performed. Alternatively, the engine module may make such positive inference only after the position is resolved favorably (i.e. the stock is sold for a financial gain).

Figure 11:
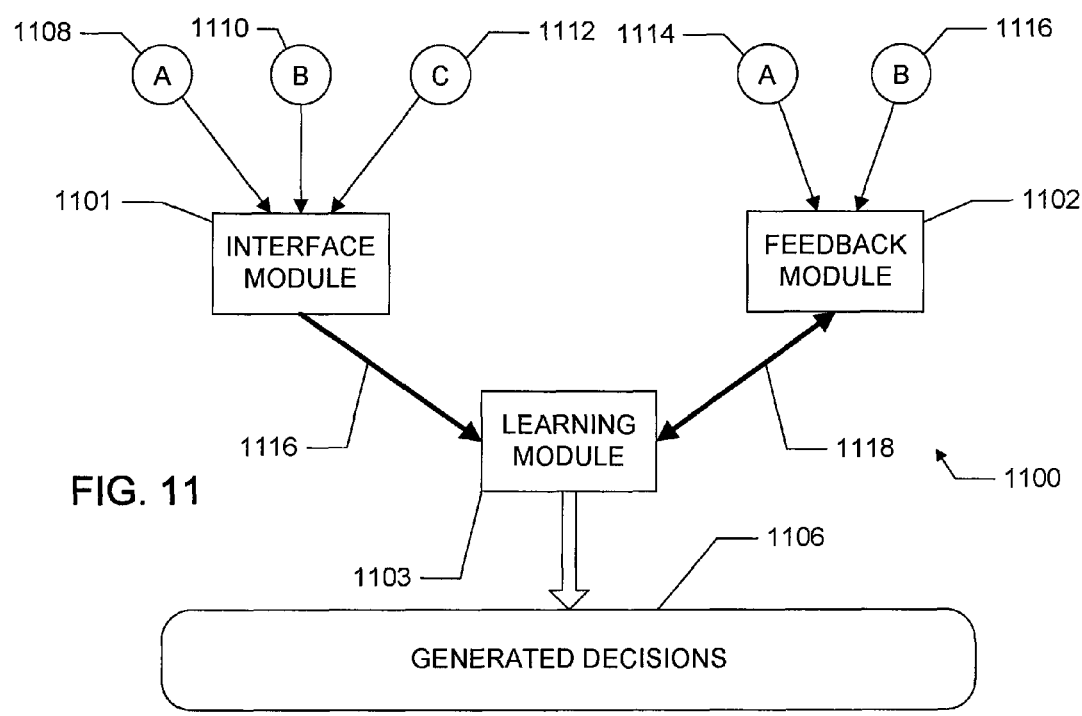
FIG. 11 is a schematic diagram of the modules contained in an example system for providing intelligent, content-based decision-making support based on acquired domain knowledge.

FIG. 11 is a schematic diagram of an example embodiment of an intelligent, content-based financial decision-making system 1100. The decision-making system 1100 depicted in FIG. 11 includes three modules 1101, 1102, and 1103. The first is an interface module 1101, the second is a feedback module 1102, and the third is a learning module 1103. When all three modules function together, they enable the system to generate decisions 1106 in conformance with a user's past use of the system and the success of the decisions made by the user. In this way, the modules 1101, 1102, and 1103 enable the system to apply domain knowledge learned by past use to suggest future decisions. It should be appreciated that each module may be implemented in any way known in the software design industry, and that each module may or may not be implemented to run on the same physical host machine. Moreover, one or more of the modules may be combined into a single module such that each module as depicted in FIG. 11 may be implemented as a process included in a module. Finally, the disclosure contemplates the addition of further modules as needed to increase functionality, reporting, display, aesthetics, or to enable a networked implementation wherein multiple users may access one of the three illustrated modules simultaneously.

The interface module 1101 enables the decision-making system 1100 to receive input to define the conditions for decision-making. The interface module 1101 receives information from various sources indicating past system activities and users' responses to those activities. The users' responses enable the decision-making system 1100 to assess the desirability of certain outcomes as viewed by the user. The interface module 1101 may specifically accept three different types of input. First, the interface module 1101 may receive user input into the system (A) 1108. For example, user input 1108 may include explicit user commands and responses to past decision-making system 1100 activities. These types of input are inputted into the decision-making system 1100 by the user by way of GUI module 106. User input 1108 may also include a user's past history of decision making. Though such decision-making histories are not explicitly inputted into the decision-making system 1100 by way of the GUI module 106, each decision is tracked (e.g. in the knowledge depository module 108) and can potentially be provided as an input to the interface module 1101. Interface module 1101 may also take as an input the results of content-based queries (B) 1110, performed as described above with respect to FIGS. 3 and 4. For example, if a user performs a content-based query searching for "firms like firm X," the results of the search may be provided to the interface module to enable the system to make decisions based on the users' past activities. Finally, interface module 1101 may take as an input past signal and pattern analysis (C) 1112, performed as described above with reference to FIGS. 5 and 6. For example, if a user wishes to reduce the noise contained in a charted set of data, the interface module may take the reduced-noise data as an input to the decision-making system 1100 to help mold the decisions suggested to the preferences of a particular user. As illustrated by arrow 1116, information and data flow from the interface module 1101 into the learning module 1103, but in a preferred embodiment, information and data do not flow from the learning module 1103 to the interface module 1101.

The feedback module 1102 enables the decisions made by the decision-making system 1100 to be evaluated as they are made either by the system itself or by a user. The feedback module 1102 thus provides information to the learning module 1103 representing user-inputted feedback and evaluation (D) 1114, or representing system-generated feedback and evaluation (E) 1116. The user-inputted feedback and evaluation 1114 may take the form of ratings of the accuracy of results or decisions, or may take the form of adjustments to the input conditions or to the decision and activity history. Additionally, the user-inputted feedback and evaluation 1114 may not be explicitly inputted by a user, but may be inferred based on the user's history of inputted requests, decisions, and the success of those decisions. Preferably, the system-generated feedback and evaluation 1116 is based on the system's accumulated domain knowledge, contained in knowledge depository module 108. The system-generated feedback and evaluation 1116 may also be based in part upon real-time data available by way of the real-time data interface 218 as discussed above. It should be appreciated that in many embodiments, the ability to generate decisions based on real-time data is desirable in the financial industry.

Moreover, the system-generated feedback and evaluation 1116 may take the form of suggested alternative decisions and/or evaluation of the user's decision history. As indicated by arrow 1118, the information flow from the feedback module 1102 to the learning module 1103 and vice versa enables the generated decisions 1106 that are eventually generated to be as accurate and reflective of the user's preferences and domain knowledge as possible. Thus, information may flow back and forth between the feedback module 1102 and the learning module 1103 many times before a decision is finally generated and executed, either by a user or by the system itself.

The learning module 1103 receives data from the interface module 1101 and the feedback module 1102. The learning module 1103 preferably uses pattern analysis, neural networks, and other related algorithms to construct an automatic decision-making machine to simulate the user decision-making process based on the various input received. Once the learning module 1103 (and more specifically, the decision-making machine contained within the learning module 1103) arrives at a decision it concludes aligns with the various input it has received, the learning module 1103 sends potential decisions or recommendations to the feedback module 1102, which, as discussed above, provides either user-based 1114 or system-based 1116 feedback as to the accuracy or applicability of a proposed decision. Based on the feedback received, the learning module 1103 refines its suggested decision and eventually arrives at an acceptable generated decision 1106. This generated decision may be automatically made and carried out, for example resulting in the purchasing or sale of one or more financial instruments. Alternatively, the decision may be proposed to an individual for final determination whether to carry out the decision and purchase or sell one or more financial instruments. During the early learning stages of the learning module's 1103 operation, the proposed decisions may not actually be made, but may be charted and tracked to ensure that eventually the decisions being suggested are appropriate and prudent. It should be appreciated that the decision-making system 1100 disclosed herein may not provide reliable suggested decisions for some amount of time due to the required learning period.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for performing intelligent financial decision making, the method comprising:
 (a) enabling a user to provide at least one input indicative of a financial decision to at least one terminal;
 (b) causing at least one processor to analyze the at least one input indicative of the financial decision to determine two conditions for decision making based on the at least one input indicative of the financial decision, the two conditions for decision making each including a characteristic of a financial object;
 (c) causing at least one memory device to store the determined two conditions for decision making;
 (d) causing the at least one processor to construct an automatic decision making machine using the determined two conditions for decision making as inputs to at least one selected from the group consisting of: a pattern analysis algorithm and a neural network;

(e) causing the at least one processor to determine at least one similarity between the two conditions for decision making using the automatic decision making machine;

(f) causing the at least one processor to determine a feature of the determined at least one similarity, the feature being one of a plurality of features, each of said plurality of features representing a complex set of characteristics of a financial object for which a definition is pre-stored and is used to determine whether that feature is present in a data set;

(g) causing the at least one processor to search a database of financial data indexed by any of the plurality of features found in the database, said search being based on the determined feature of the at least one similarity between the two conditions for decision making;

(h) causing the at least one terminal to display a generated decision based on a result of the indexed database search but not to display an indication of the determined two characteristics or the feature of the at least one similarity;

(i) enabling the user to provide feedback about the generated decision by providing at least one feedback input to the at least one terminal;

(j) causing the at least one processor to update the automatic decision making machine based on the at least one feedback input, and (k) repeating (e) through (j) until the at least one feedback input indicates that the user is satisfied with the generated decision.

2. The method of claim 1, which includes enabling the user to provide the at least one input indicative of the financial decision to at least one terminal by causing the at least one terminal to take an action selected from the group consisting of: performing a pattern-based query, performing an example-based query, performing content-based analysis, performing content-based processing, and making a decision based on a feature.

3. The method of claim 1, which includes enabling the user to provide the at least one feedback input to by displaying at least one selected from the group consisting of: a mechanism to enable the user to rate the generated decision, a mechanism to enable the user to provide an alternative to the generated decision, a mechanism to enable the user to update the condition for decision making, and a mechanism to infer feedback from the user's actions based on the generated decision.

4. The method of claim 1, wherein the terminal includes the at least one processor.

5. The method of claim 1, wherein the terminal and the at least one processor are contained in different systems located physically separate from each other.

6. The method of claim 5, wherein the terminal and the at least one processor communicate with one another via a data network.

7. The method of claim 6, wherein the data network is an Internet.

8. A method for performing intelligent financial decision making, the method comprising:

(a) enabling a user to provide at least one input indicative of a financial decision to at least one terminal;

(b) causing at least one processor to analyze the at least one input indicative of the financial decision to determine at least one condition for decision making based on the at least one input indicative of the financial decision, the at least one condition for decision making including a characteristic of a financial object;

(c) causing at least one memory device to store the at least one condition for decision making;

(d) causing the at least one processor to construct an automatic decision making machine using the determined at least one condition for decision making as an input to at least one selected from the group consisting of: a pattern analysis algorithm and a neural network;

(e) causing the at least one processor to analyze the condition for decision making using the automatic decision making machine;

(f) causing the at least one processor to determine a feature of the condition for decision making, the feature being one of a plurality of features, each of said plurality of features representing a complex set of characteristics of a financial object for which a definition is pre-stored and is used to determine whether said feature is present in the data set;

(g) causing the at least one processor to search a database of financial data indexed by any of the plurality of features found in the database, said search being based on the determined feature of the condition for decision making;

(h) causing the at least one terminal to display a generated decision based on a result of the indexed database search but not to display an indication of the determined characteristic or the feature of the condition for decision making;

(i) enabling the user to provide feedback about the generated decision by providing at least one feedback input to the at least one terminal;

(j) causing the at least one processor to update the automatic decision making machine based on the at least one feedback input; and (k) repeating (e) through (j) until the at least one feedback input indicates that the user is satisfied with the generated decision.

9. The method of claim 8, which includes enabling the user to provide the at least one input indicative of the financial decision to at least one terminal by causing the at least one terminal to take an action selected from the group consisting of: performing a pattern-based query, performing an example-based query, performing content-based analysis, performing content-based processing, and making a decision based on a feature.

10. The method of claim 9, which includes enabling the user to provide the at least one feedback input by displaying at least one selected from the group consisting of: a mechanism to enable the user to rate the generated decision, a mechanism to enable the user to provide an alternative to the generated decision, a mechanism to enable the user to update the condition for decision making, and a mechanism to infer feedback from the user's actions based on the generated decision.

11. The method of claim 8, wherein the terminal includes the at least one processor.

12. The method of claim 8, wherein the terminal and the at least one processor are contained in different systems located physically separate from each other.

13. The method of claim 12, wherein the terminal and the at least one processor communicate with one another via a data network.

14. The method of claim 13, wherein the data network is an Internet.

* * * * *